United States Patent Office 2,717,163
Patented Sept. 6, 1955

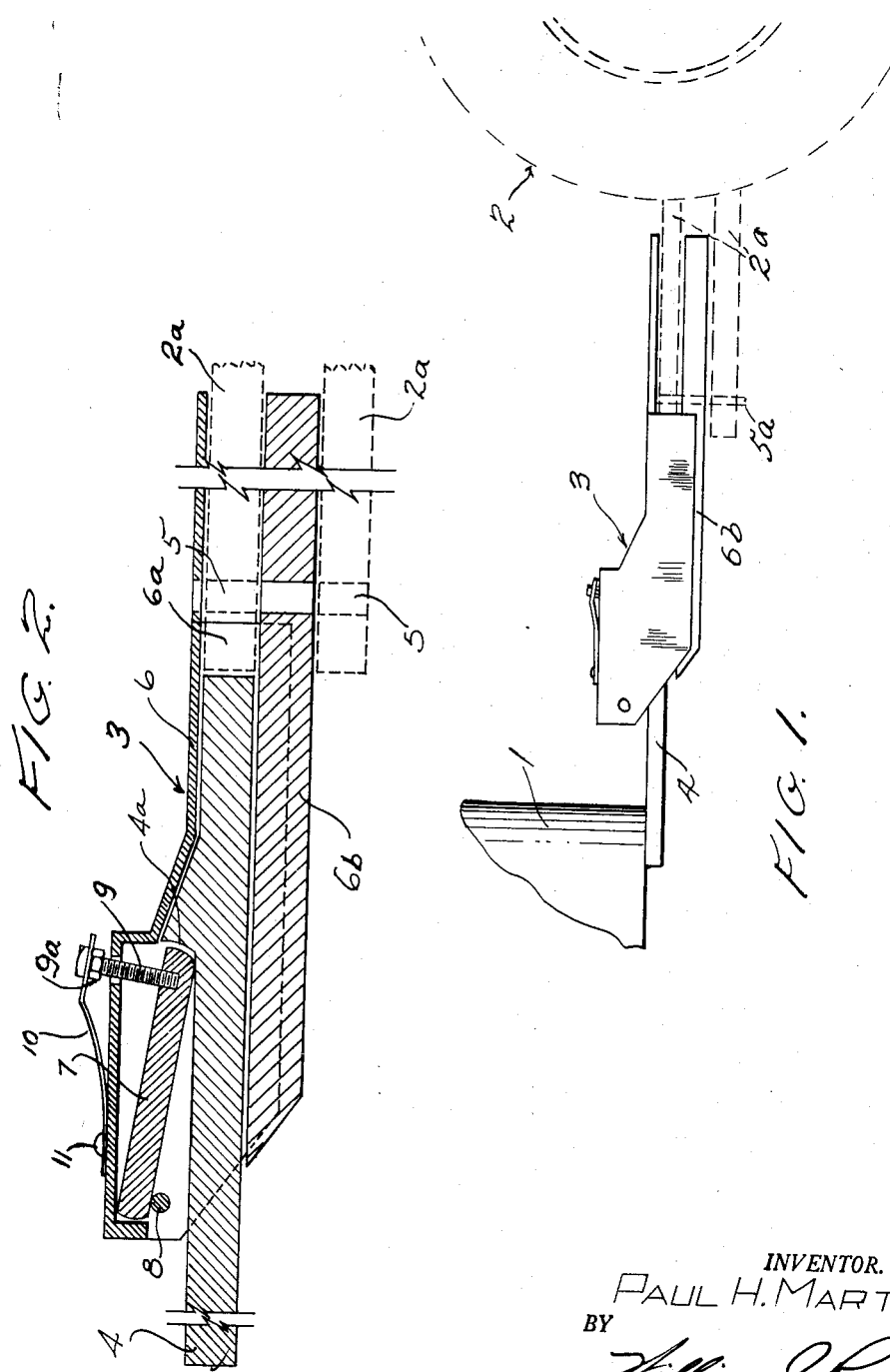

2,717,163
CONNECTION FACILITATING VEHICLE DRAFT MEANS

Paul H. Martin, Kutztown, Pa.

Application September 18, 1953, Serial No. 381,069

1 Claim. (Cl. 280—477)

This invention relates to improvements in a tractor hitch for coupling a wagon, trailer or agricultural implement to a tractor or other towing vehicle and is more particularly directed to a novel construction of means for eliminating the necessity of positioning the tractor an exact distance from the trailer or agricultural implement.

An outstanding disadvantage of many conventional types of tractor hitches is that great difficulty is encountered in coupling the hitch because it is usually necessary to position the tractor an exact distance from the trailer or drawn implement to effect coupling, or in hitches wherein such coupling can be effected without the necessity of exact distances, the structures are usually very complicated in construction, are unusually long, have relatively short life and are very apt to be accidentally uncoupled.

An object of my invention is to provide a novel tractor hitch which is devoid of the above named disadvantage of conventional hitches.

A more specific object of my invention is to provide a tractor hitch having telescopically fitting parts, one encased within and protected by the other, and which hitch is of simple construction and can be easily adjusted to align the coupling pin or bolt without the necessity of exact spacing of the tractor and trailer and which includes means for automatically locking the hitch after the coupling has been completed.

Other objects and advantages will become apparent from a study of the following description taken with the accompanying drawing wherein:

Figure 1 is a side elevational view of a tractor hitch embodying the principles of the present invention and Figure 2 is an enlarged, longitudinal cross sectional view of the tractor hitch shown in Figure 1 and illustrating the parts in the locked position.

Referring more particularly to the drawing, numeral 2 denotes a tractor or other towing vehicle for towing a trailer or agricultural implement 1 by means of a tractor hitch 3. A drawn bar 4 is securely connected to any suitable part of the trailer 1 by any suitable fastening means (not shown) and has an upwardly projecting pawl or tooth portion 4a. Closely surrounding the bar 4 is a casing 6 having secured to its top portion, side portions 6a which portions form guides for longitudinal telescoping movement of bar 4 therein. Casing 6 may either have an integral bottom wall portion 6b secured to side portions 6a, or a separate portion. If portion 6b is separate from the casing 6 as shown, it must be fastened to the tongues 2a of the draw bar 2a of the tractor by suitable fastening means (not shown) in addition to a pin or bolt 5a which extends through the bolt holes 5. Thus it will be possible to move the tractor hitch attachment or casing 6 into sliding engagement with the tongues 2a until bolt holes 5 of bar 4 and of tongues 2a are in registry. On the other hand if the lower plate 6b were integral with casing 6 by welding or otherwise fastening its sides to the vertical flanges 6a, it would, of course, be necessary to first bring the draw bar tongues 2a into telescoping engagement, as shown, and, when the holes 5 of the slidable parts are in registry, bolt the parts by inserting a bolt or pin through holes 5.

An outstanding feature of the invention resides in the specific construction of the latching or locking assembly which comprises a latching lever or plate 7 which is pivotally mounted within the casing 6 by having one end rest on a pivot pin or bolt 8 extending across the casing from one wall 6a to the other. A lifting bolt or stud 9 is screw threaded to one end of plate 7 and projects upwardly through an aperture which is formed in the top of the casing. A nut 9a is provided on bolt 9 for clamping between the nut and bolt head one end of a flat spring 10, which end has a hole through which the bolt passes. The other end of the flat spring is attached to the top of the casing by a screw or bolt 11. An alternate arrangement would be to extend pivot pin 8 through a hole formed in the forward end of lever 7, however, this would not be as advantageous as the construction shown since it would involve boring a hole through the plate 7, adding to manufacturing costs, and, more important, abnormal stresses would be concentrated on the pivot pin. As distinguished from this, in the structure shown, stresses arising from towing by the tractor would be transmitted through casing 6 by virtue of the fact that the front end of the latch 7 abuts the inner casing wall, thus eliminating the tendency of shearing of pivot pin 8. Additionally, when latching lever 7 is lifted by raising stud 9 so that it will be raised above and be free of the pawl or toothed portion, and when bar 4 and casing 6 are slidably moved away from each other, pin 8 will serve as a stop member and abut against pawl 4a to prevent complete separation of the drawn bar 4 and casing 6. Thus a dual function is performed by pin 8.

In the operation, with draw bar 2a fastened to the tractor 2, casing 6 may be moved into telescoping relationship while lever 7 is lifted by stud 9 to clear the top of pawl 4a, and casing 6 is telescopically slid relative to tongues 2a until the holes 5 in the implement tongue 2a and the corresponding hole in casing 6 and plate 6b come into registry. Bolt 5 will then be inserted for fastening the front section of the tractor hitch. Such bolting is facilitated since casing 6 may be slid with ease with respect to the bar 4 since latching lever 7 is now riding on the crest of pawl 4a. Alternatively the tongues 2a, particularly if plate 6b is already fastened thereto, may be moved into the casing until the various holes 5 are in alignment. After a bolt has been inserted to securely fasten plate 6b and the tractor tongues 2a, plate 6 may be pushed rearwardly all the way (or the trailer moved forwardly) until the position shown in the drawing is attained so that latching lever 7 will pivotally drop automatically into the locking position so that subsequent forward movement of tractor causes casing 6 together with the bar 4 fastened thereto, to be drawn as a unit.

An important feature of the invention resides in the simplicity of the parts, latching lever 7 being merely a flat plate which is completely concealed and protected against possible disengagement by the closely surrounding casing 6. Also pin 8 serves the dual function of a pivot pin for latching lever 7 as well as a stop pin for preventing complete withdrawal of casing 6 from the drawn bar 4.

Thus it will be seen that I have provided an efficient tractor hitch wherein the parts are easily slidable initially to effect easy registry of the coupling pin holes, thereby eliminating the necessity of accurate positioning of the tractor at an exact distance from the trailer or other drawn vehicle; also I have provided a tractor hitch having a casing which completely surrounds and protects the latching member against accidental dislodgement and wherein abnormal stresses on the pivot pin of the latching member are eliminated by having the latching member rest on the pin and wherein the pin serves a dual function, that is, the additional function of a stop member for preventing complete withdrawal of the casing away from the draw bar.

While I have illustrated and described an embodiment of my invention, it will be understood that this is by way of illustration only, and that various changes and modifications may be made within the contemplation of my invention and within the scope of the following claim:

I claim:

A tractor hitch comprising a drawn bar of rectangular cross-section attachable to a towed vehicle; said drawn bar having an upstanding integral pawl, a substantially tubular casing of rectangular cross-section closely surrounding said drawn bar and adapted to be longitudinally telescoped therewith, and having a coupling hole; a tractor having a draw bar in the form of tongues having holes adapted to register with said coupling hole; said casing having a rear, upwardly projecting portion forming an interior space, a pivot pin fastened in said casing and extending laterally across said space, said pivot pin serving as a stop member engageable with said pawl to prevent complete withdrawal of said casing from said drawn bar, a latching lever having the side of one end resting upon said pivot pin and having a pin extending upwardly on the other end for allowing selective lifting of said other end above the crest of said pawl to permit free sliding movement of said casing relative to said draw bar, or, upon lowering of said pawl to effect latching engagement with said pawl whereby forward drawing movement of said draw bar will draw together therewith said drawn bar and the towed vehicle.

References Cited in the file of this patent

UNITED STATES PATENTS

| | | |
|---|---|---|
| 1,178,857 | Kirner | Apr. 11, 1916 |
| 2,357,540 | Palmer | Sept. 5, 1944 |
| 2,366,294 | Stringer | Jan. 2, 1945 |
| 2,404,521 | Myers | July 23, 1946 |

FOREIGN PATENTS

| | | |
|---|---|---|
| 436,748 | Germany | Nov. 27, 1926 |